United States Patent
Tiberi et al.

(10) Patent No.: US 7,823,351 B2
(45) Date of Patent: Nov. 2, 2010

(54) STACKABLE INSULATED UNIT FOR WALL CONSTRUCTION AND METHOD OF FABRICATION THEREOF

(75) Inventors: Sylvain Tiberi, Laval (CA); Michel Mathon, Repentigny (CA)

(73) Assignee: Thermo Structure Inc., Mascouche, Québec (CA)

( * ) Notice: Subject to any disclaimer, the term of this patent is extended or adjusted under 35 U.S.C. 154(b) by 357 days.

(21) Appl. No.: 11/987,426

(22) Filed: Nov. 30, 2007

(65) Prior Publication Data

US 2008/0083177 A1    Apr. 10, 2008

Related U.S. Application Data

(63) Continuation-in-part of application No. 11/485,256, filed on Jul. 13, 2006, now abandoned.

(60) Provisional application No. 60/700,723, filed on Jul. 20, 2005, provisional application No. 60/733,171, filed on Nov. 4, 2005.

(51) Int. Cl.
*E04B 1/10* (2006.01)
*E04B 1/62* (2006.01)
*E04C 1/40* (2006.01)

(52) U.S. Cl. .................. 52/404.1; 52/404.4; 52/233; 52/284; 52/481.1; 52/415; 52/606; 52/426; 52/434; 52/564; 52/407.1; 52/407.5; 52/309.11; 52/309.7; 52/309.16

(58) Field of Classification Search .................. 52/281, 52/284, 300, 585–586, 233, 283, 596, 605–607, 52/593–594, 569–572, 309.1, 316, 574, 481.1, 52/479, 615, 578, 581, 309.7, 309.11, 309.16
See application file for complete search history.

(56) References Cited

U.S. PATENT DOCUMENTS

| | | | |
|---|---|---|---|
| 2,902,733 A * | 9/1959 | Justus | 52/284 |
| 3,552,079 A | 1/1971 | Mortensen | |
| 3,742,665 A | 7/1973 | Henry et al. | |
| 3,849,960 A * | 11/1974 | Henry et al. | 52/569 |
| 4,344,263 A | 8/1982 | Farmont | |
| 4,503,648 A | 3/1985 | Mahaffey | |
| 4,614,071 A * | 9/1986 | Sams et al. | 52/309.12 |
| 4,835,928 A * | 6/1989 | Scott | 52/426 |
| 4,937,122 A * | 6/1990 | Talbert | 428/68 |
| 5,375,641 A * | 12/1994 | Schlueter | 160/135 |
| 5,555,698 A * | 9/1996 | Mandish | 52/745.17 |
| 5,927,032 A * | 7/1999 | Record | 52/309.11 |
| 6,000,177 A | 12/1999 | Davidson | |

(Continued)

FOREIGN PATENT DOCUMENTS

CA    2326054 A1    5/2002

*Primary Examiner*—Jeanette E. Chapman
(74) *Attorney, Agent, or Firm*—Equinox Protection; Franz Bonsang, Patent Agent

(57) ABSTRACT

A stackable insulated unit for wall construction for forming a self-supporting wall structure consists of two side wooden planks spaced apart and secured to one another with an intermediate insulating layer bonded thereto, and a plurality of stud longitudinal sections transversely extending through the insulating layer and being secured thereby. The insulating layer ensures structural integrity of the stackable unit. The stud sections are preferably spaced from at least one of the side planks. The invention also includes the method of fabrication of stackable unit.

16 Claims, 6 Drawing Sheets

U.S. PATENT DOCUMENTS

| | | | | |
|---|---|---|---|---|
| 6,164,035 A | * | 12/2000 | Roberts | 52/563 |
| 6,299,386 B1 | * | 10/2001 | Byrne et al. | 405/273 |
| 6,418,686 B1 | * | 7/2002 | Record | 52/309.15 |
| 6,588,161 B2 | | 7/2003 | Smith | |
| 2002/0157334 A1 | * | 10/2002 | Smith | 52/233 |
| 2006/0168904 A1 | | 8/2006 | Muszynski | |

* cited by examiner

STACKABLE INSULATED UNIT FOR WALL CONSTRUCTION AND METHOD OF FABRICATION THEREOF

CROSS REFERENCE TO RELATED APPLICATIONS

The present application is a continuation-in-part (C.I.P.) of application Ser. No. 11/485,256, filed on Jul. 13, 2006 now abandoned, which claimed benefit of U.S. Provisional Applications for Patent Ser. No. 60/700,723, filed on Jul. 20, 2005, and Ser. No. 60/733,171, filed on Nov. 4, 2005.

FIELD OF THE INVENTION

The present invention relates to a wall building construction unit and methods and is more particularly concerned with a prefabricated insulated and stackable element, and method of fabrication thereof.

BACKGROUND OF THE INVENTION

It is well known in the art to build wooden frameworks for housing walls. An insulating core is then usually inserted in-between the studs and lintels or headers and closed with facing panels. This standard operation can be time consuming and have considerable effects in areas where the residential building period is constrained to a few months of the year due to for example a harsh winter climate.

Numerous construction elements have been proposed for wall construction such as in the following documents:

U.S. Pat. No. 2,902,733 granted to Justus on Sep. 8, 1959 for a "Corner Construction for Sawed Timber Walls";

U.S. Pat. No. 3,552,079 granted to Mortensen on Jan. 5, 1971 for a "Laminated Tongue and Groove Building Element";

U.S. Pat. No. 3,742,665 granted to Henry et al. on Jul. 3, 1973 for a "Modular Building Construction";

U.S. Pat. No. 4,344,263 granted to Farmont on Aug. 17, 1982 for a "Building Log with High Thermal Insulation Characteristics";

U.S. Pat. No. 4,503,648 granted to Mahaffey on Mar. 12, 1985 for a "Lightweight Composite Building Module";

U.S. Pat. No. 4,614,071 granted to Sams et al. on Sep. 30, 1986 for "Building Blocks";

U.S. Pat. No. 4,937,122 granted to Talbert on Jun. 26, 1990 for an "Insulated Construction Element"; and U.S. Pat. No. 6,000,177 granted to Davidson on Dec. 14, 1999 for a "Building Structure Having the Appearance of a Log Structure".

All the above lack either a provision for an insulated section in the stacking panel; an insulated element with passageways for permanently receiving longitudinal sections of conventional approved wooden studs, approved and even required by most territorial or state building codes, forming a self-supporting wall structure, especially for external walls (thereby putting the load-bearing constraints on the stacking wall sections which is not regulated or preferred in building construction).

Accordingly, there is a need for an improved log, member or unit for wall construction with a simple configuration, and a method of fabrication of the log unit.

SUMMARY OF THE INVENTION

It is therefore a general object of the present invention to provide an improved unit for wall construction, and a method of fabrication thereof.

An advantage of the present invention is that the unit for wall construction is insulated and can be easily mounted on a subjacent unit with the stud longitudinal sections providing the structural support approved for load-bearings under construction codes.

Another advantage of the present invention is that the unit for wall construction could be prefabricated at another location than the wall construction site.

A further advantage of the present invention is that the units for wall construction being relatively lightweight, can be quickly stacked on one another.

Yet another advantage of the present invention is that the unit for wall construction enables fast construction of rigid insulated walls.

Still another advantage of the present invention is that the unit for wall construction relies on the insulation material to provide structural rigidity to the unit and support to the unit components, thereby securing the two sides wooden planks to the stud longitudinal sections, without the use of any other fastening members.

Another advantage of the present invention is that the unit for wall construction includes stud longitudinal sections extending into through openings and secured to the unit, the stud longitudinal sections being used to support the structural transversal, typically vertical, loads transmitted through the wall structure.

A further advantage of the present invention is that the unit for wall construction has wall studs sections extending there through that are spaced from at least one of the two side wooden planks for increased insulation between the two side planks.

According to an aspect of the present invention, there is provided a stackable unit for wall construction that comprises: first and second opposed elongate side wooden planks secured to one another with an expanded insulating core material bonded thereto, a plurality of stud longitudinal sections transversely extending through the insulating core material and being secured thereby, said insulating core material ensuring structural integrity of said stackable unit, said stud longitudinal sections being spaced from each other along said unit.

Typically, each said stud longitudinal section is spaced from at least one of the first and second planks, and preferably from both.

In one embodiment, respective said stud longitudinal section is sized to permanently secured to the unit when inserted into corresponding said through opening, each said stud longitudinal section is sized to structurally connect to at least one corresponding said stud longitudinal section of an adjacent said unit via a securing member for forming a self-supporting wall structure and having structural loads transmitted therethrough.

Conveniently, each said stud longitudinal section has opposed first and second ends thereof to be in abutting engagement with and securable to at least one corresponding said stud longitudinal section of an adjacent said unit. Preferably, each said stud longitudinal section has a through hole extending longitudinally therealong for slidably receiving the securing member therethrough for connection with said at least one corresponding said stud longitudinal section of an adjacent said unit.

Conveniently, the securing member forces corresponding said stud longitudinal section to be in abutting engagement with said at least one corresponding said stud longitudinal section of an adjacent said unit. Typically, the securing member is a screw-nut fastener for clamping corresponding said stud longitudinal section in abutting engagement with said at least one corresponding said stud longitudinal section of an adjacent said unit.

In one embodiment, at least one of said stud longitudinal sections includes a longitudinal guiding alignment member for alignment of said at least one stud longitudinal section with a corresponding said stud longitudinal section of an adjacent said unit. Preferably, the longitudinal guiding alignment member includes a protrusion member extending longitudinally outwardly from said first end thereof and a cavity member extending longitudinally inwardly into said opposed second end thereof, said protrusion member being adapted to engage corresponding said cavity member of a stud longitudinal section of a first adjacent said unit, and said cavity member being adapted to receive corresponding said protrusion member of a stud longitudinal section of a second adjacent said unit.

In one embodiment, the stackable unit includes a tongue element protruding from an upper end side thereof and a groove element formed into a lower end side thereof, each groove element being adapted to receive a corresponding tongue element of a subjacent stackable unit. Typically, each said tongue element and said groove element extends from said first side plank to said second side plank.

In one embodiment, each said stud longitudinal section includes a space barrier extending outwardly therefrom toward said at least one of said side planks when spaced therefrom, said space barrier substantially separating a first region adjacent said stud longitudinal section from a second region adjacent said stud longitudinal section and ensuring thermal insulation between said stud longitudinal section and said at least one of said planks, said first and second regions being on either lateral side of said stud longitudinal section between said first and second side planks.

Conveniently, the space barrier is a generally narrowing down side section of an end side of said stud longitudinal section. Alternatively, the space barrier is a stud end side extension member connecting to an end side of said stud longitudinal section, said extension member having a thickness substantially an order of magnitude smaller than a thickness of said stud longitudinal section.

Conveniently, the stud longitudinal sections are generally equally spaced apart along the stackable unit.

According to another aspect of the present invention there is provided a method of fabrication of a stackable unit for wall construction, said method comprises the steps of:

a) assembling two opposite side planks with a plurality of stud longitudinal sections therebetween and spaced from each other along said planks with a tooling assembly abutting longitudinal ends of said stud longitudinal sections, said side planks and said tooling assembly forming a plurality of cavities between adjacent said stud longitudinal sections;

b) injecting a predetermined amount of an expandable insulating core material within said cavities via injection openings provided into said tooling assembly;

c) allowing said insulating core material to expand and cure so as to secure to said side planks and said stud longitudinal sections; and d) disassembling said tooling assembly from said stackable unit.

In one embodiment, each said stud longitudinal section includes a through hole extending longitudinally therealong, the step a) of said method includes:

a1) connecting said tooling assembly to said stud longitudinal sections and said side planks using bolt fasteners extending through said through holes of said stud longitudinal sections.

Conveniently, the step a) of said method includes:

a2) applying pressure onto each said side plank towards the other said side plank so as to prevent external bowing of respective said side plank.

In one embodiment, each said stud longitudinal section includes a space barrier extending outwardly therefrom toward a corresponding one said side planks to form a space between said stud longitudinal section and the corresponding side plank, said space barrier substantially separating one said cavity adjacent said stud longitudinal section from another said cavity adjacent said stud longitudinal section and ensuring thermal insulation between said stud longitudinal section and said at least one of said planks, the step b) of said method includes:

b1) injecting a predetermined amount of an expandable insulating core material within said cavities and said spaces via injection openings provided into said tooling assembly.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, wherein.

DETAILED DESCRIPTION OF THE PREFERRED EMBODIMENTS

With reference to the annexed drawings the preferred embodiments of the present invention will be herein described for indicative purpose and by no means as of limitation.

Figure 1:
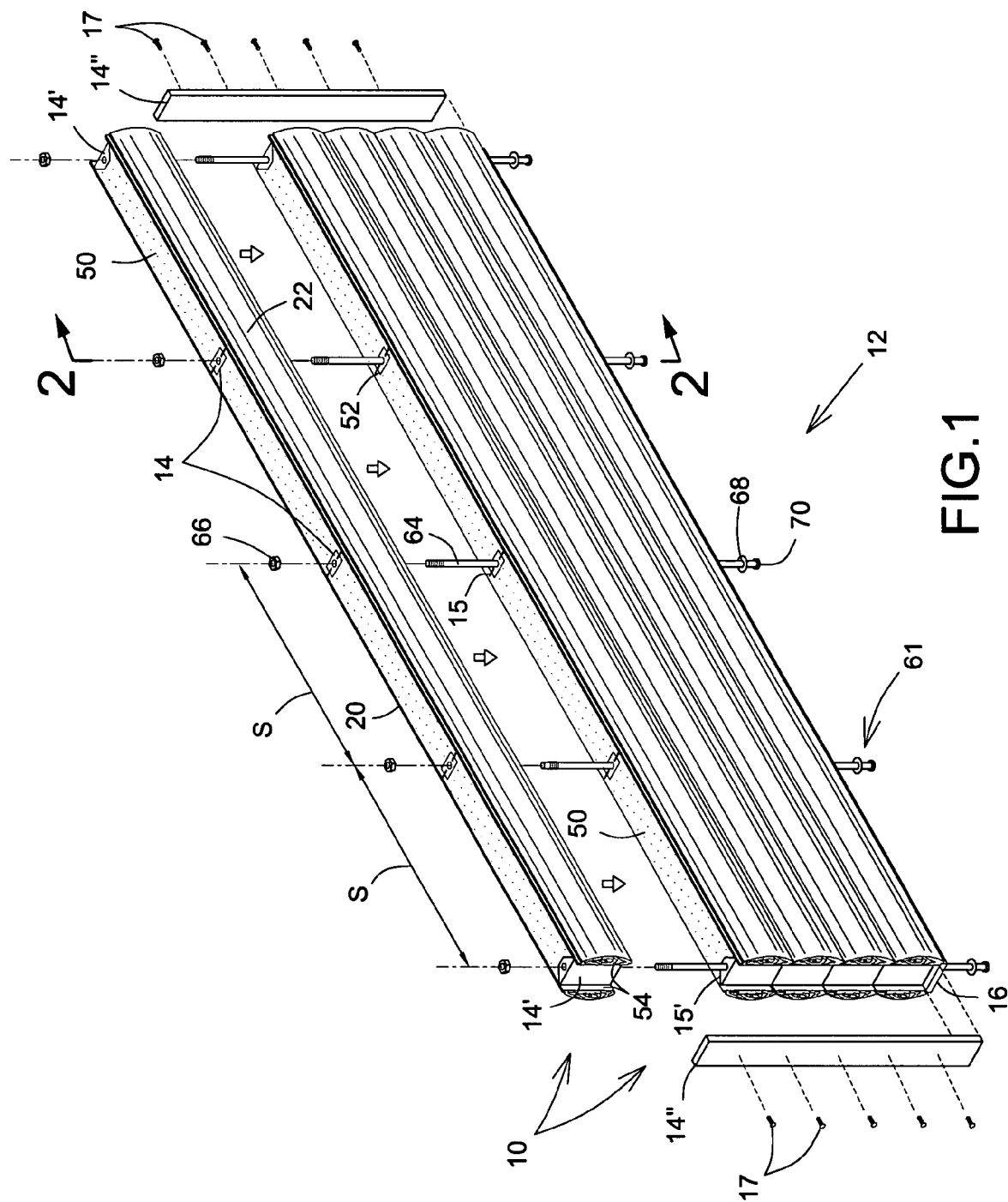
FIG. 1 is an exploded top perspective view of an embodiment of a unit for wall construction in accordance with the present invention showing units in the process of being secured on top of each other via securing members to form a wall construction.

Referring to FIG. 1, there is shown an embodiment of a stackable unit 10 in accordance with the present invention to be used in a wall construction 12. The preferably rectangular and generally longitudinal unit 10 comprises mainly a pair of wooden planks, generally flat timber, assembled side planks 20, 22 or the like, which could be engineered wooden planks (EWP), sandwiching a heat insulating core 50 made of expandable urethane, polyurethane, foamable plastic polymer or the like material injected therein to fill in all the voids or cavities located there between by expanding and curing during fabrication, as detailed hereinbelow. The height H of each wall construction unit 10 is typically of approximately seven to eight (7-8) inches, whilst the length is generally of a multiple of sixteen (16) or twenty-four (24) inches, or typically of up to approximately height (8) or twelve (12) feet. The width of each assembled plank 20, 22 is of approximately one (1) inch whilst the width W of the insulating core 50 is of about 4 to 4.5 inches to be used conveniently with notional or conventionally used two-by-four (2×4) studs, or longitudinal sections 14 thereof, as it will be clearly explained hereinafter. Alternatively, the width W of the insulating core could be of 6 to 6.5 inches to be used conveniently with notional two-by-six (2×6) studs.

In territories such as Canada and most States of the United States, when considering wooden wall construction, construction building codes require a (wooden) wall frame structure to respect certain standards for load-bearing requirements. Notional two-by-four studs can be used with respect to these above-mentioned standards with certain criteria. One of those criteria is the generally horizontal spacing S between the two-by-four or vertical structural studs. In FIG. 1, the spacing S is understood to respect those construction building codes and are generally of, for example, twelve (12) or sixteen (16) or twenty-four (24) inches.

A plurality of stud longitudinal sections 14 transversely extend through the insulating core 50 while typically remaining in register with the surfaces thereof, and are secured thereby. The stud longitudinal sections 14 are spaced, preferably equally, from each other along the unit 10, as identified as spacing S in FIG. 1. Further, in order to provide insulation through the thickness of the unit 10 at the location of each stud longitudinal section 14, the latter is typically spaced from at least one, preferably both, of the two side planks 20, 22, that space 51 being generally filled with the insulating material 50, thereby forming insulating bands 52 so as also to offer thermal insulation across the entire length (and height) of the wall to be constructed. The insulating core material 50 provides the structural rigidity and integrity to and of the log unit 10 by securing to all the components, side planks 20, 22 and stud longitudinal sections 14, which are not directly secured to each other (although they may abut to each other), but only via the insulating core 50. This securing characteristic of the insulating core 50 depends on the core density that is linked to the amount or quantity of material injected into the corresponding cavities 58 (refer below for details), a standard structural integrity requires the density of the insulating core material to be larger or equal than a predetermined density level. The fact that the insulating material 50 is used to secure all unit components together during the fabrication process of the unit, as detailed hereinbelow, allows the stud sections 14 to be spaced from at least one, preferably both, of the two side plank(s) 20, 22 for improved thermal insulation property of the unit 10.

Figure 2:
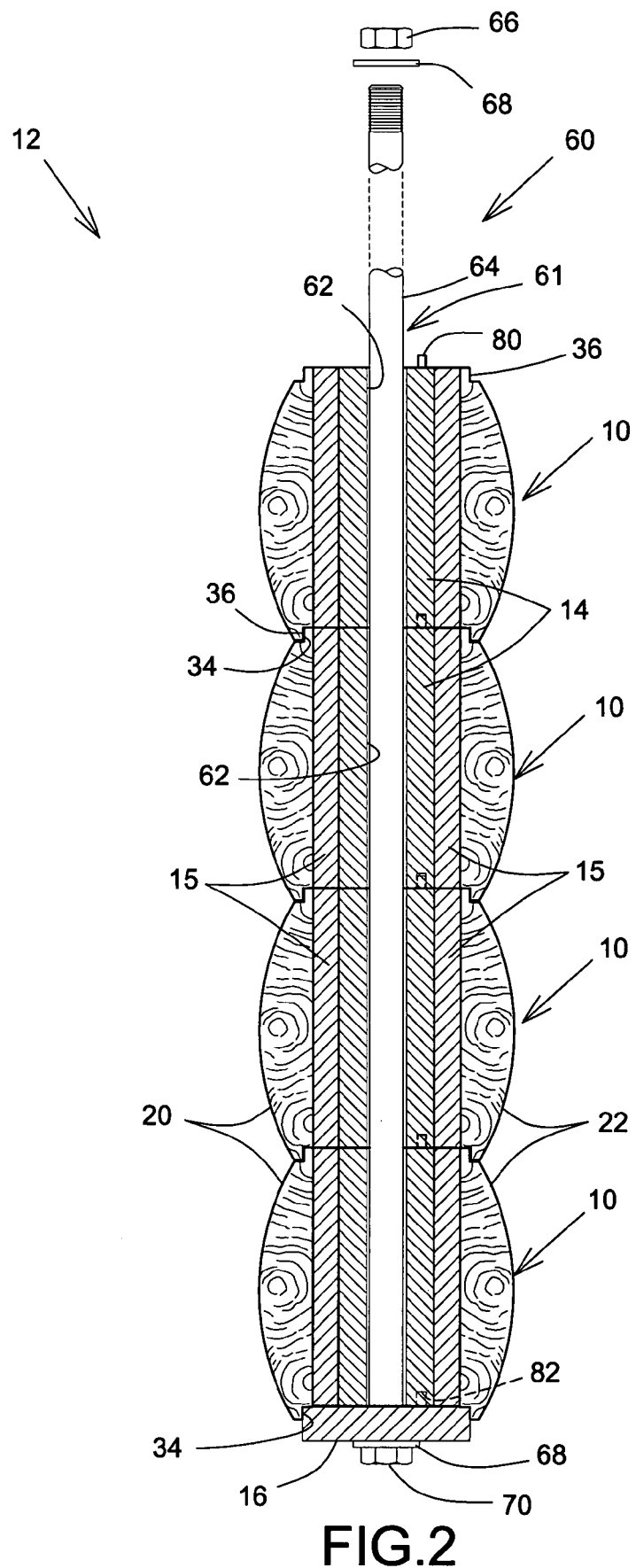
FIG. 2 is an enlarged partially broken section view taken along line 2-2 of FIG. 1, showing a plurality units of the embodiment secured to each other via a screw-nut fastener.

Generally vertically, an upper tongue 36 protrudes along the inner side on the upper end side of the assembled plank 20, 22 to fit or nest with a lower groove 34 formed along the inner side on the lower end side of another of the same assembled plank 20, 22. Also generally vertically, the groove 34 is generally slightly deeper than the tongue 36 to ensure an end-to-end abutment contact of the respective stud longitudinal sections 14, sized therefor, and the insulating core 50 when two adjacent units 10 are positioned one above another, or stacked, as shown in FIG. 2. Typically, the tongue 36 and groove 34 each extends from the first side plank 20 to the second side plank 22, to include an inner portion of each plank 20, 22. Understandingly, such design of the height H of the stud longitudinal sections 14 and the insulating core 50 offers the wall to be constructed a thermal insulation across its entire vertical height. As shown in FIGS. 1 and 2 for a lowermost (or uppermost, not shown) unit 10 example, the groove 34 (or tongue 36) could receive (or engage) a bottom or sole plate 16 (or a top plate, header or lintel not shown).

In the longitudinal direction and as shown in the Figures, at each longitudinal end of the unit 10, there is typically a stud longitudinal section 14', and a recess 54 is left between the stud longitudinal section 14' and the adjacent assembled planks 20, 22. The thickness T of the recess 54 is preferably of about half the thickness of the generally vertical component 14" used for structural load-bearing walls, i.e. generally two-by-four studs, or three-quarter of an inch (0.75 inch), but could be sized to entirely receive the stud 14" (1.5 inch thick), or even more without departing from the scope of the present invention. This recess 54, can be used to secure all adjacent units 10 together using a common vertical stud, such as two-by-six stud (not shown), to end a wall structure or the like.

Each stud longitudinal section 14' typically has a through hole 62 extending longitudinally therealong and is adapted to structurally connect to at least one stud longitudinal section 14' of an adjacent unit 10' via a securing member 60, typically a screw-nut fastener 61 (see FIG. 2) that slidably engages aligned or registered through holes 62 of stud sections 14 of adjacent units 10, to form the self-supporting wall structure and have transversal structural loads, typically vertical, transmitted therethrough. Typically, each stud section 14 is in abutting engagement with the subjacent stud section 14 or the load support. With this type of securing member 60 (although other types thereof could be considered, such as conventional screws or the like, without departing from the scope of the present invention), the lower unit 10 is first secured to the sole plate 16 and then subsequent units 10 are stacked over and secured to the subjacent one, with all the stud sections 14 forming the structural load path of the wall structure 12.

The screw-nut fastener 61 essentially clamps all the corresponding stud sections 14 in abutting engagement with each other and to the subjacent sole plate 16 or the like and typically a corresponding top plate (not shown). The screw-nut fastener 61 typically includes an elongate rod 64 having a threaded free end that screwably receives a nut 66 and washer 68. The head 70 of the rod 64, or a hidden nut (not shown), is typically locked to the lower plate 16 (see FIG. 2).

With this securing member 61, all units 10 are assembled over each other before they are secured to each other and to the lower plate 16 and typically the upper plate (not shown) with all stud sections 14 abutting adjacent ones to form the structural load path of the wall structure 12.

As schematically shown in dotted lines in FIG. 2, each stud section 14 could have a protrusion member 80, such as a tongue or the like, extending longitudinally outwardly from a first end thereof and a cavity member 82, such as a groove or the like, extending longitudinally inwardly into an opposed second end thereof. The protrusion member 80 is adapted to engage a corresponding cavity member 82 of an adjacent stud section 14 as an additional securing means as well as a longitudinal guiding alignment means between two adjacent units 10 when being assembled to one another.

Typically, between adjacent units 10, either a coating of epoxy substance or a joining set retarding and expanding epoxy substance, glue, adhesive, resin, foam or the like (not shown) is layered to ensure proper sealing contact there between.

Once the wall 12 is assembled as previously described, the set retarding and expanding epoxy has generally the effect of completely filling and sealing the voids and minimal openings (not shown) between the stacked units 10, and between the unit 10 and the bottom plate 16 or top plate, header or lintel. It may be necessary to shave or clean the dried epoxy that would be apparent from the exterior of the wall 12. An appropriate epoxy retarding time is approximately between 10 and 30 minutes. Obviously, doors and windows (not shown) are usually present in this type of construction, and the assembly of the units 10 is not adversely affected apart from requiring an appropriate shortening or cutting in some instances, which is standard in the construction industry and not adversely time-consuming.

As shown in FIGS. 3 to 6, the present invent also includes a method of fabrication of the stackable unit 10 for wall construction 12. The method typically comprises the steps of:
 a) assembling two opposite side planks 20, 22 with a plurality of stud longitudinal sections 14 therebetween and spaced from each other along the planks 20, 22 with a tooling assembly 100 abutting longitudinal ends of the stud longitudinal sections 14 as well as the upper and lower sides of the side planks 20, 22. The latter with said tooling assembly 100 form a plurality of cavities 58 between adjacent stud longitudinal sections 14;
 b) injecting a predetermined amount of an expandable insulating core material 50 within said cavities 58 via injection openings 106 provided into the tooling assembly 100;
 c) allowing the insulating core material 50 to expand and cure so as to secure to the side planks 20, 22 and the stud longitudinal sections 14; and
 d) disassembling the tooling assembly 100 from the stackable unit 10.

Figure 4:
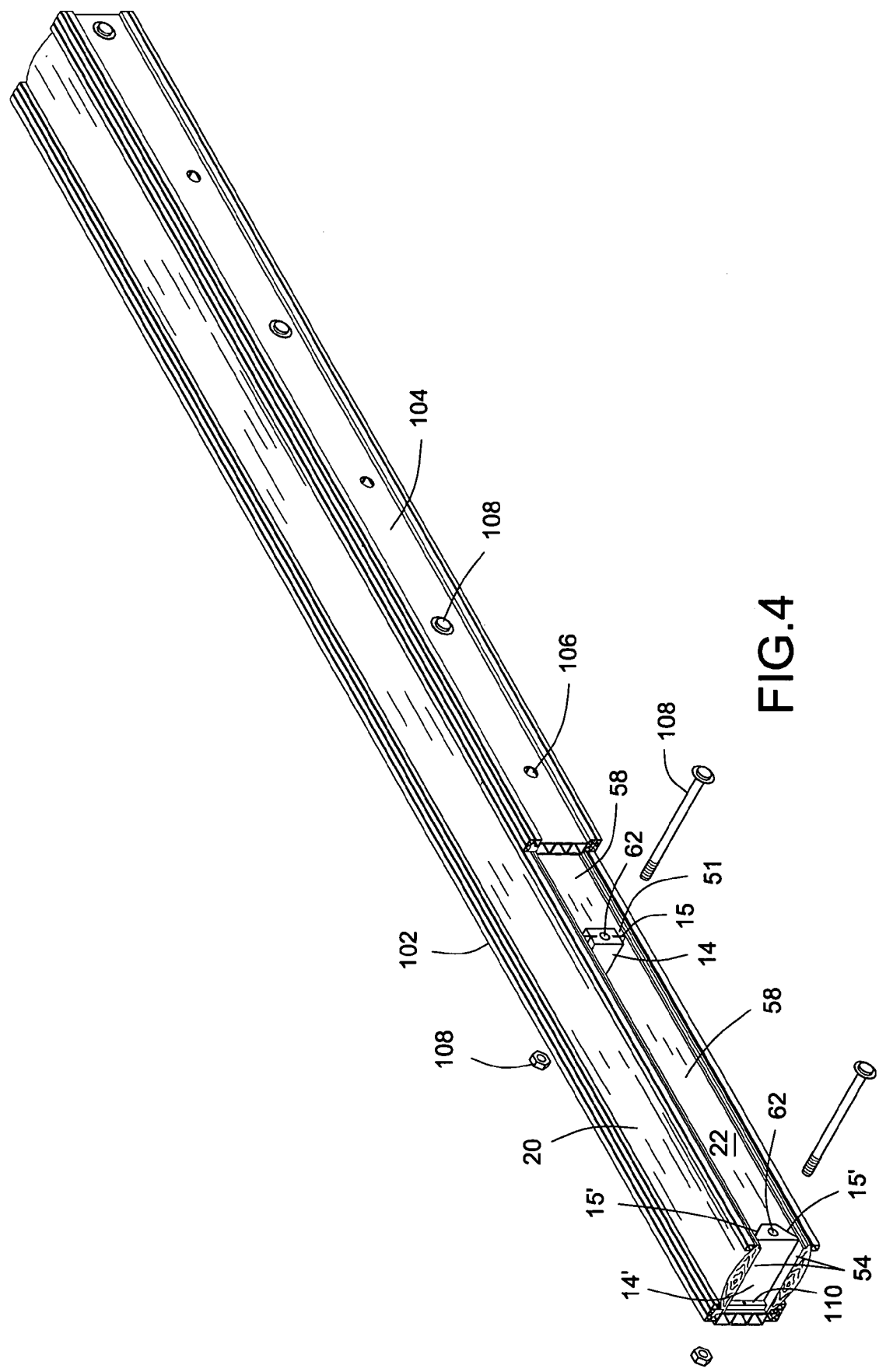
FIG. 4 is a partially broken exploded perspective view of a unit of FIG. 3, being assembled with its tooling.
Figure 5:
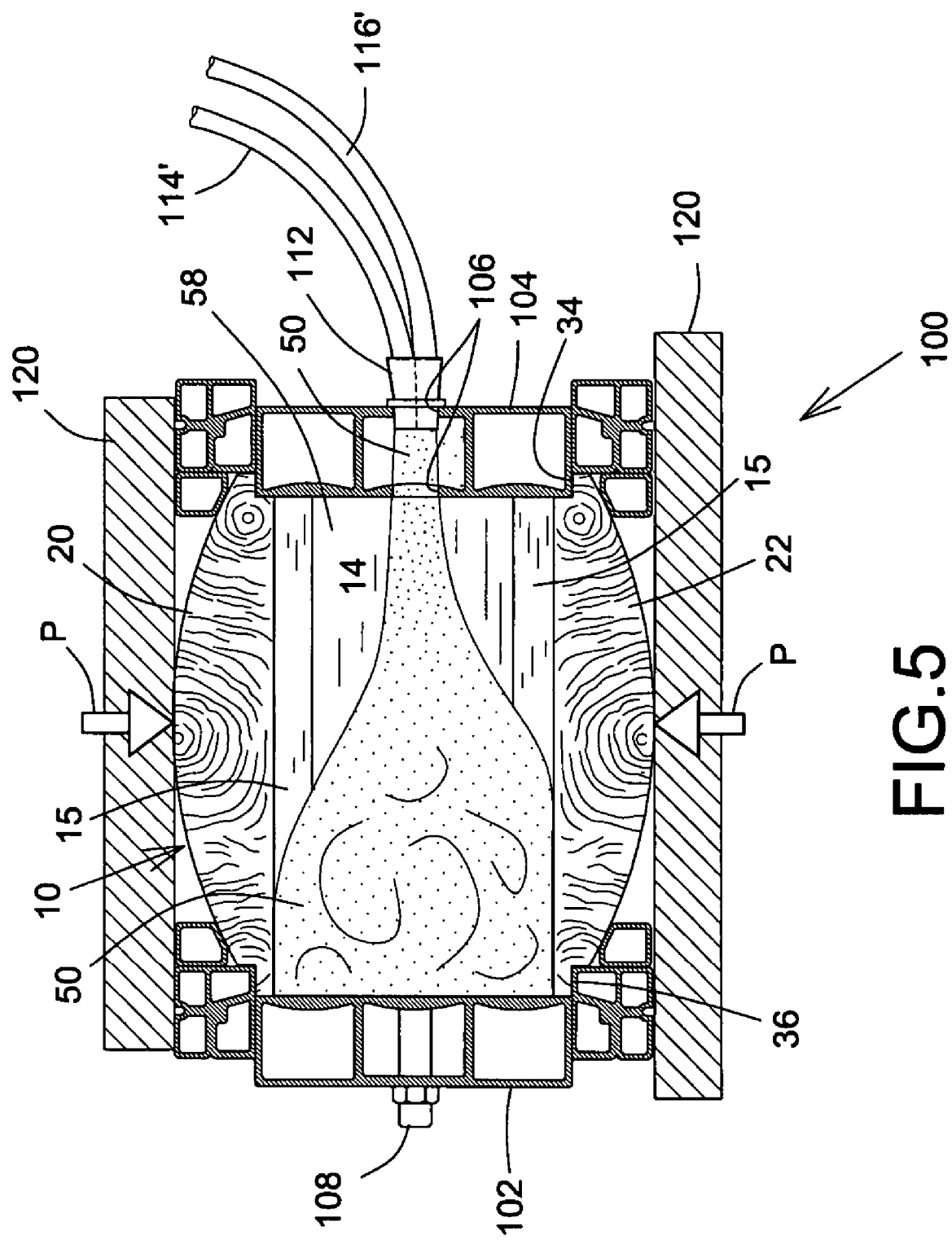
FIG. 5 is an enlarged section view taken along line 5-5 of FIG. 3, showing the insulating material being injected therein.

Typically, as shown in FIGS. 4 and 5, the tooling assembly 100 includes two upper and lower side frames 102, 104, or bars or plates or the like, each side frame being secured in abutting engagement with corresponding longitudinal ends of the stud longitudinal sections 14 and corresponding side of the side planks 20, 22, preferably using a series of bolt fasteners 108 (or clamps (not shown) or the like could alternatively be used to secure the side frames 102, 104 to the unit components) releasably extending through the through holes 62, as shown in FIG. 4. These bolts 108 ensure proper positioning of the respective stud sections 14 relative to the side planks 20, 22 and the other stud sections 14. Preferably, as seen in FIGS. 4 and 5, the upper side frame 102 is provided with a groove essentially similar to the groove 34 of a unit 10 to register with the corresponding tongue 36 of the unit 10, while the lower side frame 104 is provided with a tongue essentially similar to the tongue 36 of a unit 10 to register with the corresponding groove 34 of the unit 10.

In order to separate adjacent cavities 58, where the separating stud section 14 is spaced from the side plank 20, 22, the stud longitudinal section typically includes a space barrier 15 that extends outwardly therefrom toward the corresponding spaced side plank(s). The space barrier substantially physically separates a cavity 58, or region, adjacent a stud longitudinal section 14 from the other cavity 58 adjacent the same stud longitudinal section 14 (the two cavities being on either lateral side of the stud longitudinal section, between said first and second side planks), and ensures thermal insulation between the stud longitudinal section and the corresponding spaced plank 20, 22, without affecting the thermal bridge there between.

Typically, as shown in all internal stud sections 14 of the stackable unit 10 in FIGS. 1, 2, 4, 5 and 6, the space barrier 15 is a stud end side extension member connected (by gluing, staples, partial channeling insertion, and the like) to an end side of each stud longitudinal section 14. The side extension member 15 is typically made out of non-thermally conductive material such as plastic, cardboard, wooden particulate panel and the like, and has a thickness substantially at least an order of magnitude smaller than a thickness of the stud longitudinal section, depending on the specific thermal properties of the material. The side extension member 15 is relatively rigid to essentially prevent the expandable foam 50 injected into one of the cavities 58 from getting out of the cavity as much as possible, as shown in FIG. 5, in order to ensure that the cavity 58 is properly and entirely filled with the insulating material 50.

Figure 6:
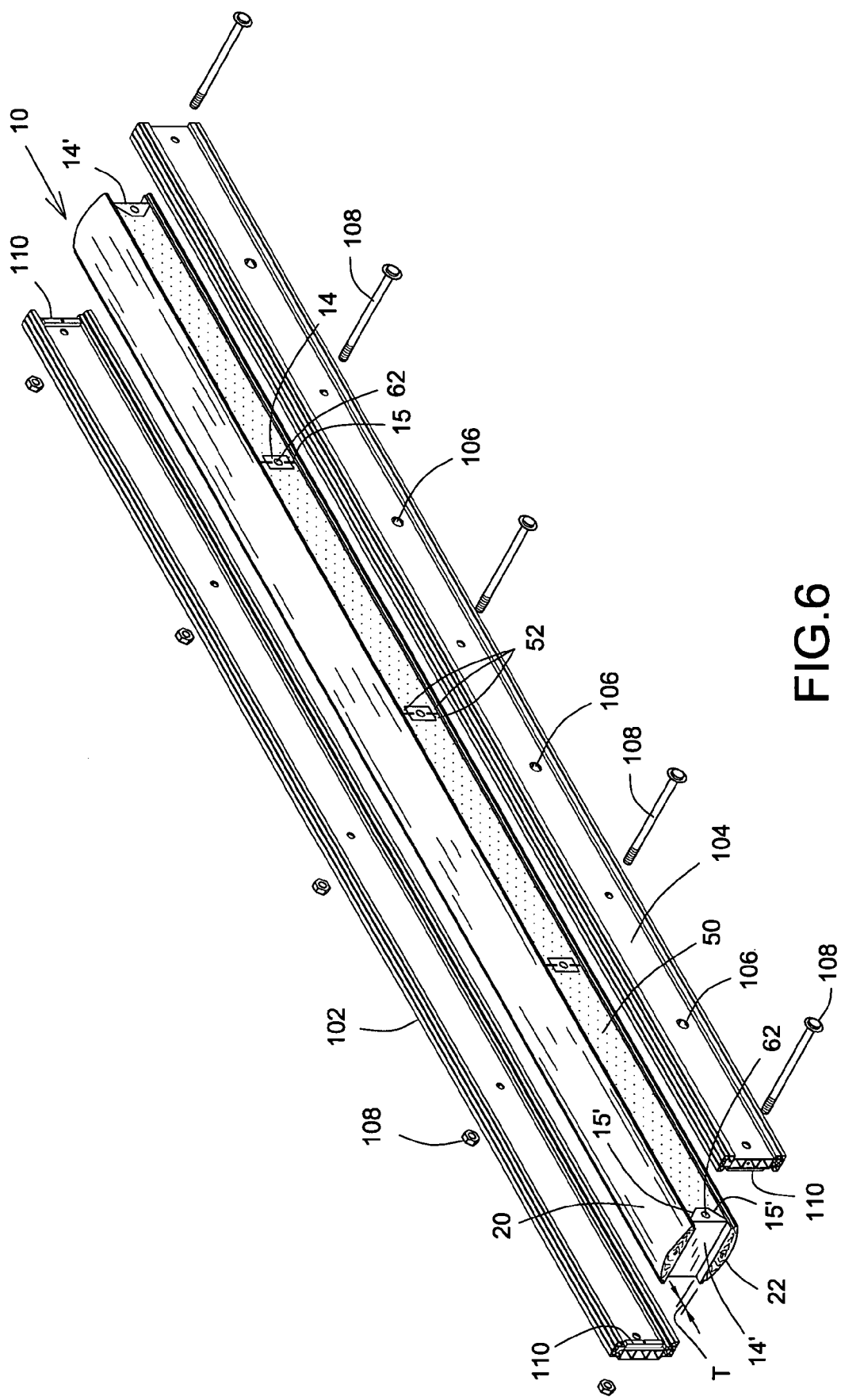
FIG. 6 is a view similar to FIG. 4, showing the tooling being disassembled from the unit after injection of the insulating material therein.

Also, especially at the longitudinal ends of the stackable unit 10, as shown in FIGS. 1, 4 and 6, the space barrier can be a generally narrowing down side section 15', or tapering off, of an end side of the end stud longitudinal section 14', preferably from the inner lateral side toward the outer lateral side to keep the latter as unaltered as possible to provide a nice and convenient unit end finish.

Essentially the space barrier 15 allows most of the physical space between the stud section 14, 14' and the plank 20, 22 is filled with the insulating core material 50 to thermally isolate the stud section 14, 14' from the corresponding plank 20, 22.

Furthermore, in order to prevent any rotation of the end stud sections 14' during fabrication of the unit 10 about the bolt fastener 108 extending along its through hole, due the force created by the expanding foam 50 being injected into the adjacent cavity 58 by the injection openings 106 and expanding (typically with about a 100:1 ratio) therein, the side frames 102, 104 typically includes stud rotation stoppers 110 secured thereto, as shown in FIGS. 4 and 6.

Figure 3:
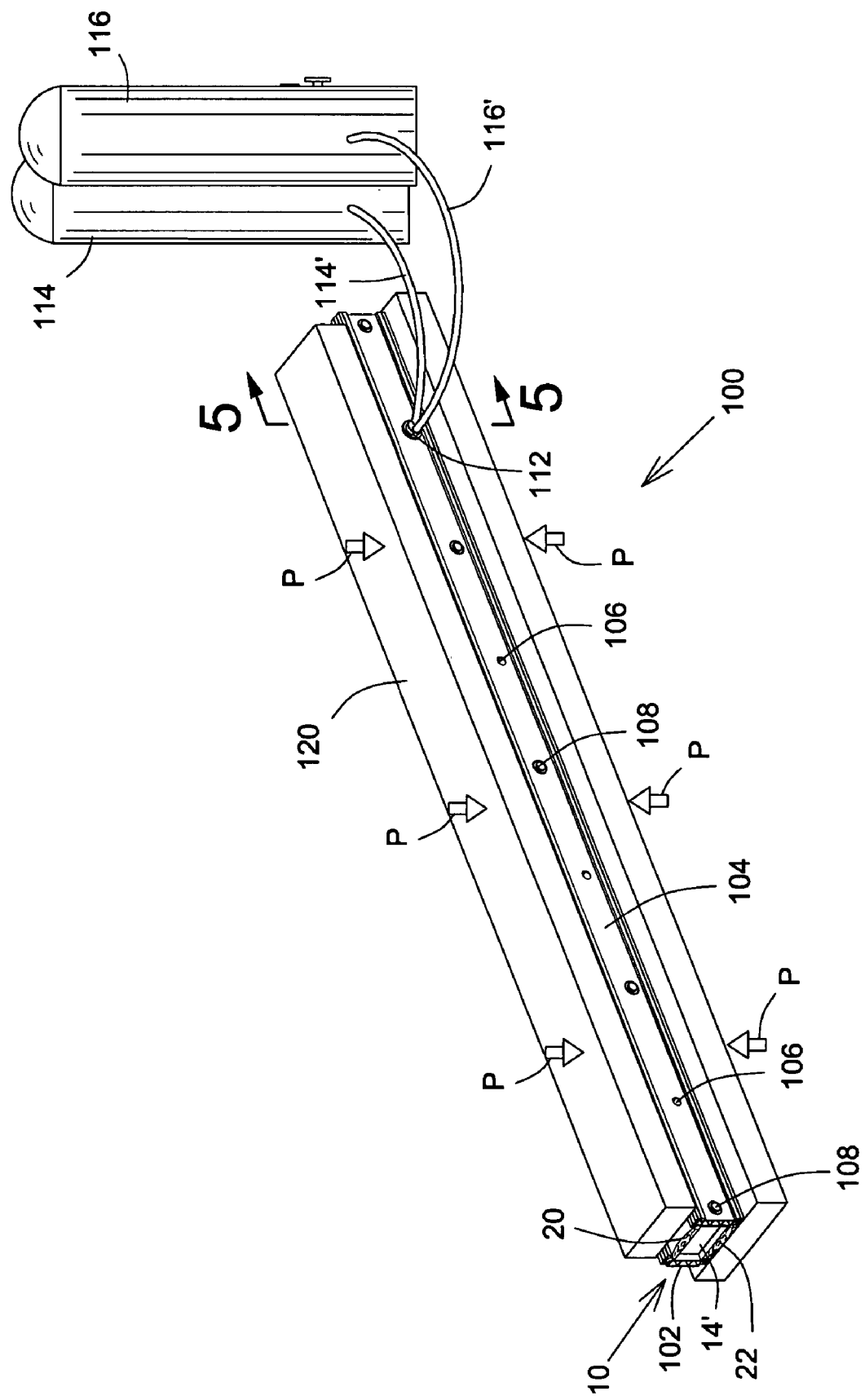
FIG. 3 is a top perspective view of the embodiment of the unit of FIG. 1, being assembled side-by-side with the tooling for fabrication thereof.

In order to prevent the side planks 20, 22 from outwardly bowing and/or popping out from the side frames during injection and expansion of the insulating material 50 (even though the side planks are physically retained at the edges thereof by notches or channels into the side frames 102, 104), the method typically includes application of side pressure onto each side plank 20, 22 towards the other one 22, 20, as indicated by arrows P of FIGS. 3 and 5. As schematically illustrated in FIG. 3, the side pressure P is externally applied by the used of a conventional press 120 or the like pressure mechanism.

Although the cavities 58 of a stackable unit 10 are typically successively (or sequentially) injected with the expandable insulating material 50, using the nozzle 112 successively and releasably inserted into the injection openings 106. The nozzle 112 is connected to the typically two pressurized containers 114, 116 via corresponding hoses 114', 116' to feed the typically two materials that chemically react (expand and cure) with each other when mixed inside the cavity to form the insulating core material 50; the latter typically being a two-part material.

Although not illustrated, it would be obvious to one skilled in the art that all cavities of a same unit 10 could be simultaneously filled using respective nozzles without departing from the scope of the present invention.

Before assembling of the of the tooling assembly 100 on the stackable unit 10, as illustrated in FIG. 4, the surfaces of the side frames 102, 104 that will get into contact with the insulating material 50 during injection thereof are preferably coated with a release agent or the like (not shown) in order to ease the disassembly thereof from the stackable unit 10, after fabrication of the unit, as illustrated in FIG. 6.

As shown in FIG. 1, in order to better ensure integrity of the wall 12 during handling thereof, side longitudinal studs 14" are typically secured, via screws 17 or the like fasteners, to the end stud sections 14' of the assembled units 10, at both ends of the wall 12. These end studs 14" could eventually be removed later on site, if required.

Although not illustrated, it would be obvious to one skilled in the art that the two side planks 20, 22 could have different external shapes, especially between interior and exterior wall surfaces to have different wall finishes or looks, especially all cavities 58 of a same unit 10 could be simultaneously filled using respective nozzles 112 without departing from the scope of the present invention.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

We claim:

1. A stackable unit for wall construction, the unit comprising: first and second opposed elongate side wooden planks secured to one another with an expanded insulating core material bonded thereto, a plurality of stud longitudinal sections transversely extending through the insulating core material and being secured thereby, said insulating core material ensuring structural integrity of said stackable unit, said stud longitudinal sections being spaced from each other along said unit, each said stud longitudinal section being spaced from at least one of the first and second planks, and including a space barrier extending outwardly therefrom toward said at least one of said side planks when spaced therefrom, said space barrier substantially separating a first region adjacent said stud longitudinal section from a second region adjacent said stud longitudinal section and ensuring thermal insulation between said stud longitudinal section and said at least one of said planks, said first and second regions being on either lateral side of said stud longitudinal section between said first and second side planks.

2. A unit according to claim 1 said space barrier is a generally narrowing down side section of an end side of said stud longitudinal section.

3. A unit according to claim 1 wherein respective said stud longitudinal section is sized to permanently secured to the unit when inserted into corresponding said through opening, each said stud longitudinal section is sized to structurally connect to at least one corresponding said stud longitudinal section of an adjacent said unit via a securing member for forming a self-supporting wall structure and having structural loads transmitted therethrough.

4. A unit according to claim 3 wherein each said stud longitudinal section has opposed first and second ends thereof to be in abutting engagement with and securable to at least one corresponding said stud longitudinal section of an adjacent said unit.

5. A unit according to claim 4 wherein each said stud longitudinal section has a through hole extending longitudinally therealong for slidably receiving the securing member therethrough for connection with said at least one corresponding said stud longitudinal section of an adjacent said unit.

6. A unit according to claim 5 wherein each said securing member forces corresponding said stud longitudinal section to be in abutting engagement with said at least one corresponding said stud longitudinal section of an adjacent said unit.

7. A unit according to claim 6 wherein the securing member is a screw-nut fastener for clamping corresponding said stud longitudinal section in abutting engagement with said at least one corresponding said stud longitudinal section of an adjacent said unit.

8. A unit according to claim 4 wherein at least one of said stud longitudinal sections includes a longitudinal guiding alignment member for alignment of said at least one stud longitudinal section with a corresponding said stud longitudinal section of an adjacent said unit.

9. A unit according to claim 8 wherein said longitudinal guiding alignment member includes a protrusion member extending longitudinally outwardly from said first end thereof and a cavity member extending longitudinally inwardly into said opposed second end thereof, said protrusion member being adapted to engage corresponding said cavity member of a stud longitudinal section of a first adjacent said unit, and said cavity member being adapted to receive corresponding said protrusion member of a stud longitudinal section of a second adjacent said unit.

10. A unit according to claim 1 wherein said stackable unit includes a tongue element protruding from an upper end side thereof and a groove element formed into a lower end side thereof, each groove element being adapted to receive a corresponding tongue element of a subjacent stackable unit.

11. A unit according to claim 10 wherein each said tongue element and said groove element extends from said first side plank to said second side plank.

12. A unit according to claim 1 wherein each said stud longitudinal section is spaced from the first and second planks.

13. A unit according to claim 1 wherein said space barrier is a stud end side extension member connecting to an end side of said stud longitudinal section, said extension member having a thickness substantially an order of magnitude smaller than a thickness of said stud longitudinal section.

14. A unit according to claim 12 wherein said space barrier is a generally narrowing down side section of an end side of said stud longitudinal section.

15. A unit according to claim 12 wherein said space barrier is a stud end side extension member connecting to an end side of said stud longitudinal section, said extension member having a thickness substantially an order of magnitude smaller than a thickness of said stud longitudinal section.

16. A unit according to claim 1 wherein the stud longitudinal sections are generally equally spaced apart along the stackable unit.

* * * * *